(12) United States Patent
Ganter (10) Patent No.: US 11,674,541 B2
(45) Date of Patent: Jun. 13, 2023

(54) LOCKING PIN WITH PROTECTED LOCKING MECHANISM

(71) Applicant: Otto Ganter GmbH & Co. KG Normteilefabrik, Furtwangen (DE)

(72) Inventor: Stefan Ganter, Furtwangen (DE)

(73) Assignee: OTTO GANTER GMBH & CO. KG NORMTEILEFABRIK, Furtwangen (DE)

( * ) Notice: Subject to any disclaimer, the term of this patent is extended or adjusted under 35 U.S.C. 154(b) by 1107 days.

(21) Appl. No.: 16/230,731

(22) Filed: Dec. 21, 2018

(65) Prior Publication Data

US 2020/0040928 A1 Feb. 6, 2020

(30) Foreign Application Priority Data

Aug. 1, 2018 (DE) .......................... 102018118617.7

(51) Int. Cl.
*G05G 5/06* (2006.01)
*F16B 21/16* (2006.01)
(Continued)

(52) U.S. Cl.
CPC ............ *F16B 21/165* (2013.01); *F16B 19/02* (2013.01); *F16B 19/109* (2013.01);
(Continued)

(58) Field of Classification Search
CPC ............ Y10T 403/604; Y10T 403/598; Y10T 403/599; F16B 21/125; G05G 5/06
(Continued)

(56) References Cited

U.S. PATENT DOCUMENTS 2,635,317 A * 4/1953 Frank ..................... B64D 25/06
24/639
4,113,221 A 9/1978 Wehner
(Continued)

FOREIGN PATENT DOCUMENTS

DE 10338621 3/2005
DE 102008047041 3/2010
(Continued)

*Primary Examiner* — Flemming Saether
(74) *Attorney, Agent, or Firm* — Faegre Drinker Biddle & Reath LLP (57) ABSTRACT

A locking pin with a locking mechanism (8, 27, 28) that has a guide sleeve (3) that can be attached to a machine part, and a pin (2) connected to an actuator button (6), which passes through a central bore (14) in the actuator button (6), and which can be axially displaced and secured in a hole in the guide sleeve (3) counter to and by means of the force of a compression spring (7) by actuating the actuator button (6), wherein the pin (2) can be brought into at least two locking positions in the guide sleeve (3) by means of the locking mechanism (8, 27, 28) located in the central bore (17), wherein the locking mechanism (8, 27, 28) is sealed in the central bore (14) of the actuator button (6) in the region of a second guide sleeve (12) that is coaxial to the first guide sleeve (3) and connected thereto, and is composed of a locking sleeve (8) secured to the actuator button (6), the sleeve extension (15) of which forms a locking contour (28) in conjunction with a locking recess (27) located in the region of the second guide sleeve (12).

20 Claims, 8 Drawing Sheets

(51) Int. Cl.
*F16B 19/02* (2006.01)
*F16B 19/10* (2006.01)

(52) U.S. Cl.
CPC ........ *Y10T 403/598* (2015.01); *Y10T 403/599* (2015.01); *Y10T 403/604* (2015.01)

(58) Field of Classification Search
USPC .................................. 403/324, 328; 411/347
See application file for complete search history.

(56) References Cited

U.S. PATENT DOCUMENTS

| | | | | |
|---|---|---|---|---|
| 4,165,854 | A * | 8/1979 | Duly | ........................ A47C 3/34 403/324 |
| 5,586,852 | A * | 12/1996 | Ganter | .................... F16B 21/12 411/353 |
| 6,746,058 | B2 | 6/2004 | Kienzler | |
| 6,868,590 | B2 * | 3/2005 | Bentrim | ................ F16B 13/061 24/458 |
| 7,198,306 | B2 | 4/2007 | Ambs | |
| 7,585,126 | B2 * | 9/2009 | Ling | ........................ G06F 1/187 403/348 |
| 8,393,840 | B2 * | 3/2013 | Chiu | ...................... F16B 5/0266 411/353 |
| 9,091,293 | B1 * | 7/2015 | Tseng | ...................... F16B 21/12 |
| 2014/0099155 | A1 * | 4/2014 | Chen | ....................... E04H 15/46 403/83 |

FOREIGN PATENT DOCUMENTS

| | | |
|---|---|---|
| DE | 202008013348 | 3/2010 |
| DE | 202015003789 | 7/2015 |
| EP | 1236910 | 9/2002 |
| EP | 2163772 | 3/2010 |
| EP | 2253857 | 11/2010 |
| EP | 3098461 | 11/2016 |

* cited by examiner

Fig. 1 (Unlocked)

Fig. 2 (Locked)

Fig. 3 (Locked)

Fig. 4 (Unlocked)

Fig. 5 (Locked)

LOCKING PIN WITH PROTECTED LOCKING MECHANISM

CROSS-REFERENCE TO RELATED APPLICATION

The present application claims priority to DE 102018118617.7, filed Aug. 1, 2018, the entire disclosure of which is hereby expressly incorporated herein by reference.

BACKGROUND/SUMMARY

The subject matter of the disclosure relates to a locking pin with a protected locking mechanism.

In coordination with all of the relevant industrial branches such as food, pharmaceutical and cosmetic industries or biotechnology, the governmental health authorities regard both their main duties, as well as their concerns therein, to keep products for nutrition or the treatment of humans, as well as animals in the broadest sense, as free from damaging effects as possible. In the framework of this political position, the harmlessness, quality and storage life of the product given to the consumer are decisive. All efforts to protect the consumer are therefore aimed at product safety, in order to protect against toxic substances and relevant microorganisms and eliminate health risks, both prophylactically as well as sustainably.

It is characteristic of the aforementioned industrial fields in which hygienically very sensitive products are produced in part, that the aims of the law originally only comprised hygienic and qualitative measures for the products, while in the processing plants, only the cleanliness prior to processing was considered important. In previous years, legal guidelines have been added to these requirements: "Hygienic Design," i.e. the easily cleaned and hygienic design of the processing plants, is regarded as an important requirement for safe production as set forth by the consumer protection laws.

Recent findings and economic considerations have shown that only by combining the two aims, "product" and "production plant," can the intended high level of quality be obtained in the products with a longer shelf-life.

The idea of "hygienic design" is described on the basis of fundamental examples in the textbook, "Gerhard Hauser: Hygienische Produktionstechnologie, 2008, pp. 1-7, WILEY-VCH Verlag GmbH & Co. KGaA, Weinheim, ISBN: 978-3-527-30307-3.

Hygiene is presently understood to refer to, in addition to the fundamental meaning relating to "health" or "promoting health," all fields that have the aim of preventing risks and danger to human health through contamination by relevant microorganisms and other substances when consuming products.

For this reason, production processes must be optimized from a technological perspective (e.g. coordination of mass flows, dwell times, temperatures), and controlled with regard to possible effects on the products. In order to also eliminate contamination by microorganisms and substances that reduce quality, all of the facilities, apparatuses and components, as well as the processing environment, particularly with processing facilities that are exposed to the environment during production or need to be inspected. In a comprehensive quality control, all causes of negative effects to the product must be eliminated.

Although in many fields in the aforementioned industries product processing and cleaning have always been regarded as equally important, the positive effects of hygienic plants and component designs have not been regarded as relevant, or have been simply neglected for some time.

In some fields, the view is taken that cleanliness can be ensured in practically any facility through a high concentration of appropriate, largely aggressive cleansers and disinfectants, as well as through sufficient cleaning periods and high temperatures. Furthermore, the argument is currently raised that with products that are pasteurized or sterilized immediately before bottling or packaging, hygienic aspects during the production may not necessarily play a decisive role, because killing relevant microorganisms in the last step is ultimately decisive.

The fact that, when there is already an increased load to the product with microorganisms during production, this can have a decisive effect on the quality thereof, and makes decontamination more difficult and expensive, is being neglected thereby. Moreover, the increased risk of resulting toxic metabolic products with an increased and uncontrolled number of microorganisms needs to be taken into account.

Because of the learning processes in this field, the perspective has changed decisively in the past, such that promotion of a hygienic facility design has taken on substantial prominence. Technical terms such as "hygienic design" have become commonplace among persons skilled in the art whose work involves questions of hygiene in conjunction with production and production plants. The ease of cleaning, and thus the success in cleaning, can be improved by hygienic design, using appropriate structural design measures, which have also become legal requirements in various fields, thus ensuring that the facilities are cleaned.

It is known from the intellectual properties DE202015003789U1, DE10338621B4, DE102008047041B4, DE202008013348U1 and EP2163772B1, from the same applicant, that the locking mechanism in a locking pin is located on the outside, i.e. on the radial, lower circumference of a guide sleeve.

The function of a locking pin described therein is comprised in full in the present disclosure.

The subject matter of EP 2 163 772 B2 discloses a locking mechanism located in the actuator button, which is unprotected on the lower exposed end of the actuator button lying opposite a guide sleeve. The actuator button is spring loaded such that it can be displaced axially on the guide sleeve. An external thread is located on the guide sleeve, with which the guide sleeve can be screwed onto an arbitrary machine surface.

An unsealed hole for receiving a spring-loaded, displaceable release button is located in the base region of the actuator button. The locking mechanism for the locking pin is composed of guide lugs directed radially outward on the inner circumference of the sleeve-like extension of the actuator button, which interact with opposing radial annular lips in the region of the guide sleeve. Particles of dirt and other contaminants can thus collect in the space between the guide sleeve and the actuator button, which is open toward the bottom, and impair the functioning of the locking mechanism.

Moreover, there is the disadvantage that such an assembly does not satisfy increased hygiene demands, because the parts of the locking mechanism that extend radially outward from the guide sleeve are exposed to the contaminants, subject to breakage, and furthermore do not satisfy the requirements of a hygienic design. Contaminant deposits can form there, thus preventing use of the known locking pins in hygienically protected environments.

An object of the disclosure is therefore to further develop a locking pin with a locking mechanism, such that it satisfies the increased hygienic requirements of a hygienic design.

It is provided in an exemplary design of the disclosure that the locking mechanism is moved into the sealed interior of the actuator button, meaning that the (first) guide sleeve extends with axial sleeve-like extensions into a central bore in the actuator button, and that the locking mechanism is sealed in the area between the axial extensions of the guide sleeve—thus forming a second guide sleeve—and the central bore in the actuator button.

It is provided in a preferred embodiment that the locking mechanism is sealed in the central bore, and that the second guide sleeve extends with its coaxial, second extensions, into the central bore of the actuator button in a sealed manner.

As a result, none of the components of the locking mechanism project unprotected in or on the outer, first guide sleeve that receives the displaceable locking pin, and instead, these components are sealed in the interior of the actuator button, and also received in the second guide sleeve with axial extensions, wherein the second guide sleeve forms a materially integrated component with the first guide sleeve.

The first guide sleeve is thus entirely smooth and flat, and sealed off from the actuator button, and the entire locking mechanism is protected in the actuator button itself, and sealed therein.

In order to satisfy special hygiene demands, the guide sleeve and/or the actuator button can be made of a polished stainless steel, the surface roughness of which is less than 0.04 micrometers in certain exemplary embodiments.

The locking mechanism is made of a locking sleeve located in the central bore in the actuator button according to an exemplary embodiment of the disclosure, which is a sleeve that is open at one end, and is permanently connected coaxially to the actuator button such that it cannot be displaced in the central bore of the actuator button.

The non-rotating connection between the locking sleeve and the inner surface of the actuator button is obtained through a detent pin projecting axially upward, which detent pin engages in a dedicated blind hole on the inner surface of the actuator button, thus securing the locking sleeve to the actuator button such that it cannot be displaced.

Instead of a non-rotatable attachment with a detent pin between the locking sleeve and the inner surface of the actuator button, any other type of securing means can be used, e.g. an adhesive bond, clamp connection or other type of connection that ensures that the locking sleeve is non-rotatably received in the interior of the actuator button such that it cannot be displaced.

In a further development of the disclosure, the locking sleeve and the actuator button can form a single integral component, meaning that when the actuator button is made of plastic, for example, the locking sleeve in the interior of the actuator button is also made of a plastic of the same type, and is connected thereto in an materially integrated manner.

This is then a homogenous injection molded component, which connects the actuator button to the locking sleeve in a material bonded manner.

The guide sleeve can be secured to a mounting surface with any means of attachment, e.g. in the manner of a clamping mount, a screw attachment, or an attachment in conjunction with a threaded nut, wedge, or other fastener.

The important thing is that there are no longer any components of the locking mechanism extending radially beyond the guide sleeve, and instead, the entire locking mechanism, comprising the locking sleeve and the associated opposing and housing-like locking contours are located in the interior of the locking pin, sealed in the interior of the actuator button.

As a result, the locking mechanism in the interior of the actuator button is entirely sealed with respect to the environment, because the rod seal on the inner surface of the actuator button ensures that it is securely sealed off from the external circumference of the cylindrical guide sleeve.

Instead of such a rod seal, other sealing assemblies can also be used, e.g. an O-ring, cord ring, or compression gland seal, or some other type of seal.

If higher hygiene requirements do not need to be satisfied, the rod seal described above is not necessary.

The locking of the locking pin with the internally integrated locking mechanism takes place such that the actuator button is locked at the bottom to the cylindrical guide sleeve in a spring-loaded manner when locked in place, counter to the force of a dedicated compression spring.

In order to unlock it, the actuator button is rotated approx. 90°, until the locking contour of the locking sleeve becomes disengaged from the opposing locking recess fixed in relation to the housing on the guide sleeve, automatically moving the actuator button to the raised position as a result of the spring force of the compression spring. It consequently ends up in a locked rotational position, i.e. it can no longer automatically rotate to the unlocked state.

This has the advantage that the actuator button does not first have to be raised against the force of the compression spring, but instead it can be rotated directly from the one locked position to the other without raising it.

In an exemplary embodiment of the disclosure, the locking contour is formed by a bevel at an angle to the longitudinal axis, formed by two separate arc segments having different radii. The one arc segment forms a locking contour, while the adjoining arc segment form a non-locking curve segment.

Instead of two diametrically opposite locking contours, fixed in relation to the housing and located in the locking sleeve, a configuration of four such locking contours can be disposed in the shape of a star. Other shapes are also possible.

The inventive subject matter of the present disclosure comprises not only the subject matter of the individual claims, but also any combination of the claims.

All information and features disclosed in the documents, including the abstract, and in particular the spatial designs shown in the drawings, can be claimed as part of the disclosure. The use of the terms "substantial" or "according to the disclosure," or "substantial to the disclosure," is subjective, and does not imply that said features must be a component of one or more of the claims.

BRIEF DESCRIPTION OF THE DRAWINGS

The exemplary embodiments of the disclosure shall be explained below on the basis of drawings illustrating just one embodiment. Further features and advantages substantial to the disclosure can be derived from the drawings and their descriptions.

Therein.

DETAILED DESCRIPTION OF THE DRAWINGS

Figure 1:
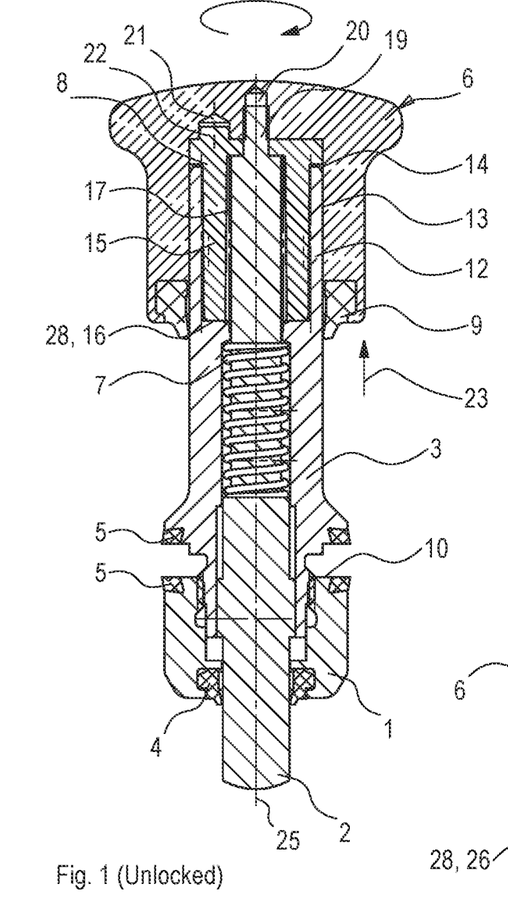
FIG. 1: shows a section through a locking pin according to the disclosure in the unlocked state.
Figure 2:
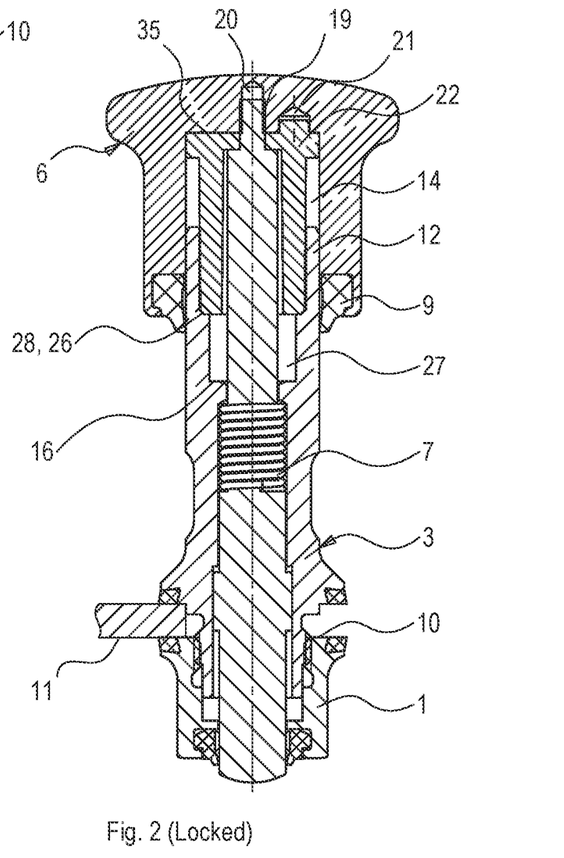
FIG. 2: shows the section through the locking pin in the locked state.

A locking button is shown in general in FIGS. 1 and 2, composed substantially of an upper actuator button 6 in the exemplary embodiment shown therein, which can be made of any material, preferably a metal or plastic material.

The locking mechanism is located in the central bore 14 of the actuator button 6, which is substantially composed of a locking sleeve 8 in the exemplary embodiment, which is received in the interior of the actuator button 6 such that it cannot be rotated or displaced, and interacts with a dedicated, basically cylindrical guide sleeve 3, wherein the guide sleeve 3 can likewise be made of an arbitrary material, e.g. metal or plastic.

In order to satisfy the hygiene requirements, it is provided that the locking mechanism, composed of the locking sleeve 8, is located in the central bore 14, and that also there are no components projecting radially from the guide sleeve 3 of the locking mechanism that could be prone to contamination.

The guide sleeve 3 can accordingly be attached to any mounting surface with any type of screw fastener or attachment. In the exemplary embodiment—which is not limiting to the scope of the disclosure—it is provided that the guide sleeve 3 has a circumferential sealing ring 5 on its lower end, which is embedded in a radial lip on the guide sleeve 3.

A sealing nut 1 is provided opposite this lip, with its radially enlarged diameter accommodating the sealing ring 5, which is likewise provided with a sealing ring 5 on its outer radial circumference, which is likewise embedded therein.

The sealing nut 1 is also screwed onto a dedicated external thread on the guide sleeve 3 with a further sealing ring 4.

A clamp 10 is formed in the space between the two opposing sealing rings on the guide sleeve 3 and the sealing nut 1 (such that it is sealed off), in which a mounting plate 11 can engage, for example, by means of which the entire locking pin can be fastened to a mounting plate—shown only in part—and secured in a hole therein.

Instead of the sealed screw attachment of the locking button to the sealing nut 1 shown in the drawings, any other type of sealing attachment can also be used, e.g. a sealed screwing into a dedicated cylindrical hole in a mounting plate, or wedge, clamp or adhesive connections as well.

In the exemplary embodiment in the drawings, the guide sleeve 3 has a central bore 17, in which a spring-loaded pin 2 that can be displaced axially by the force of a compression spring 7 is located.

In the exemplary embodiment in the drawings, the pin 2 passes through the hole in the sealing nut 1 in a sealed manner, thus forming an actuating end, by means of which the pin 2 can lock into a hole in a machine housing, not shown, or can be disengaged from this hole.

In order to satisfy the increased hygiene requirements described in the general description, it is also provided that a radially inward facing rod seal 9 is integrated in the lower end of the actuator button 6, which bears in a sealing manner with its inner circumference on the outer circumference of the guide sleeve 3, such that the entire spring-loaded actuator button 6 can be moved axially (in the direction of arrow 23, and back) in a sealed manner on the cylindrical guide sleeve 3.

Instead of an integrated rod seal 9, other sealing measures can also be used, e.g. an O-ring, cord ring, or the rod seal 9, or with lower hygiene requirements, these can be omitted entirely.

What is important here is that there are no longer any components of the locking mechanism on the outer circumference of the guide sleeve 3, because the locking mechanism is entirely integrated in the central bore 19 of the actuator button 6.

For this purpose, the guide sleeve 3 enters, with a second guide sleeve 12, which is open at the top and is an integral component of the first guide sleeve 3, the central bore of the actuator button, and the outer circumference of the second guide sleeve 12 forms a sliding surface 13 for the inner circumference of the actuator button in the region of the central bore 14.

The hygienic design is obtained in that the locking mechanism 27, 28 is sealed in the central bore of the actuator button 6 at the inner end surface 35 of the central bore 17 by rod seal 9 located at an axial spacing thereto, and the guide sleeve 3 extends with the coaxial, second axial guide sleeve 12, into the central bore 14 of the actuator button 6, sealed by the rod seal 9.

The pin 2 is connected to an upper threaded bolt 19 in a material bonded or non-material bonded manner, which is screwed into a dedicated hole 18 on the inner surface of the actuator button 6.

Instead of this threaded connection, other connections can be used, e.g. an adhesive or welded connection. It is likewise possible for the threaded bolt 19 to be a rivet stud, riveted to the actuator button 6.

The locking mechanism is substantially composed of a sleeve-shaped locking sleeve 8, which is secured in a blind hole 21 in the actuator button 6 in the inner end wall 35 with its acentric, axially aligned detent pin 22, and retained there such that it cannot be displaced. It is thus non-rotatably and non-displaceably connected to the actuator button 6.

Figure 8:
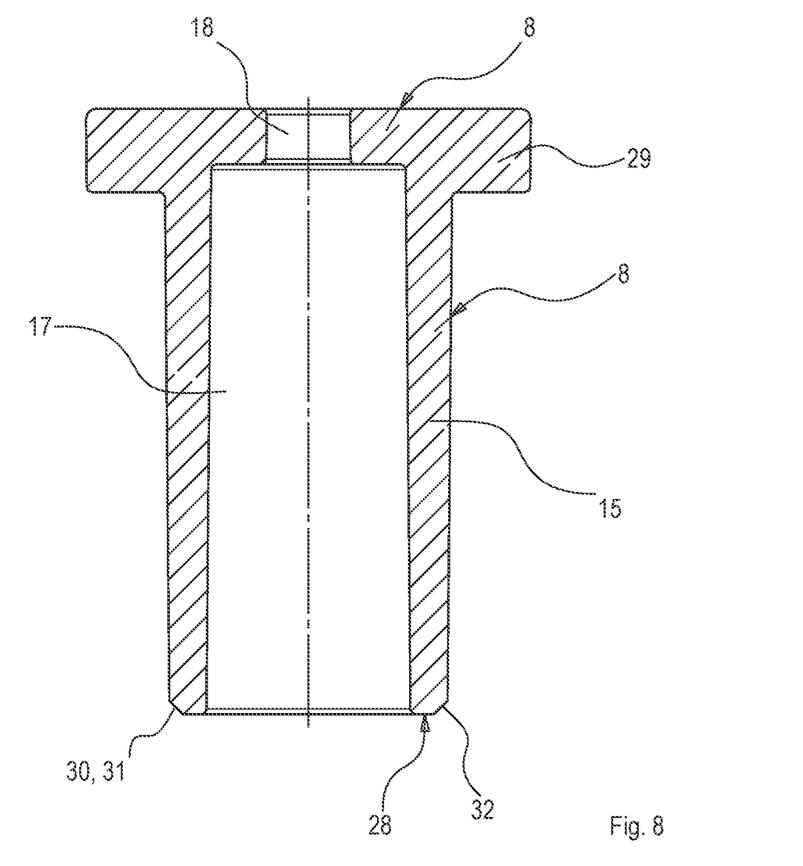
FIG. 8: shows a section through the locking sleeve according to FIGS. 6 and 7.

The sleeve-shaped locking sleeve 8 forms a sleeve extension 15 that extends axially downward, which likewise defines a central bore 17 (see FIG. 8).

The central bore 17 with the indicated central radial tolerance can also be entirely eliminated, because the sleeve extension 15 of the locking sleeve can also bear in a form fitting manner on the outer circumference of the pin 2.

The locking mechanism itself is formed by an end stop surface 16 in the guide sleeve 3, which interacts with a dedicated locking contour 28 of the locking sleeve 8, as shall be explained below based on the drawings in FIGS. 6 to 8.

FIG. 1 shows the unlocked position of the locking pin and FIG. 2 shows the locked position. These figures differ in that the actuator button 6 is moved upward, in the direction of the arrow 23 in FIG. 2, and in that it is pulled upward, compressing the compression spring 7.

It is also pulled upward into its locked position, counter to the force of the compression spring 7, in the direction of the arrow 23, and rotated 90°, specifically in the direction of the arrow 24, about its longitudinal axis 25.

In comparison, FIG. 2 shows the actuator button 6 rotated 90°. Note that the section plane of FIG. 1 is perpendicular to the section plan of FIG. 2.

Instead of a 90° rotation to reach the two locking positions, other angles of rotation can be used, e.g. 30°, 60°, 120°, etc. This depends on the type of locking contour 28, 34, which shall be described based on FIGS. 6 to 8. There can also be more than two locking positions.

It should be added that a central threaded hole 20 is formed on the inner surface of the actuator button 6, into which the threaded bolt 19 of the pin 2 is screwed.

Figure 3:
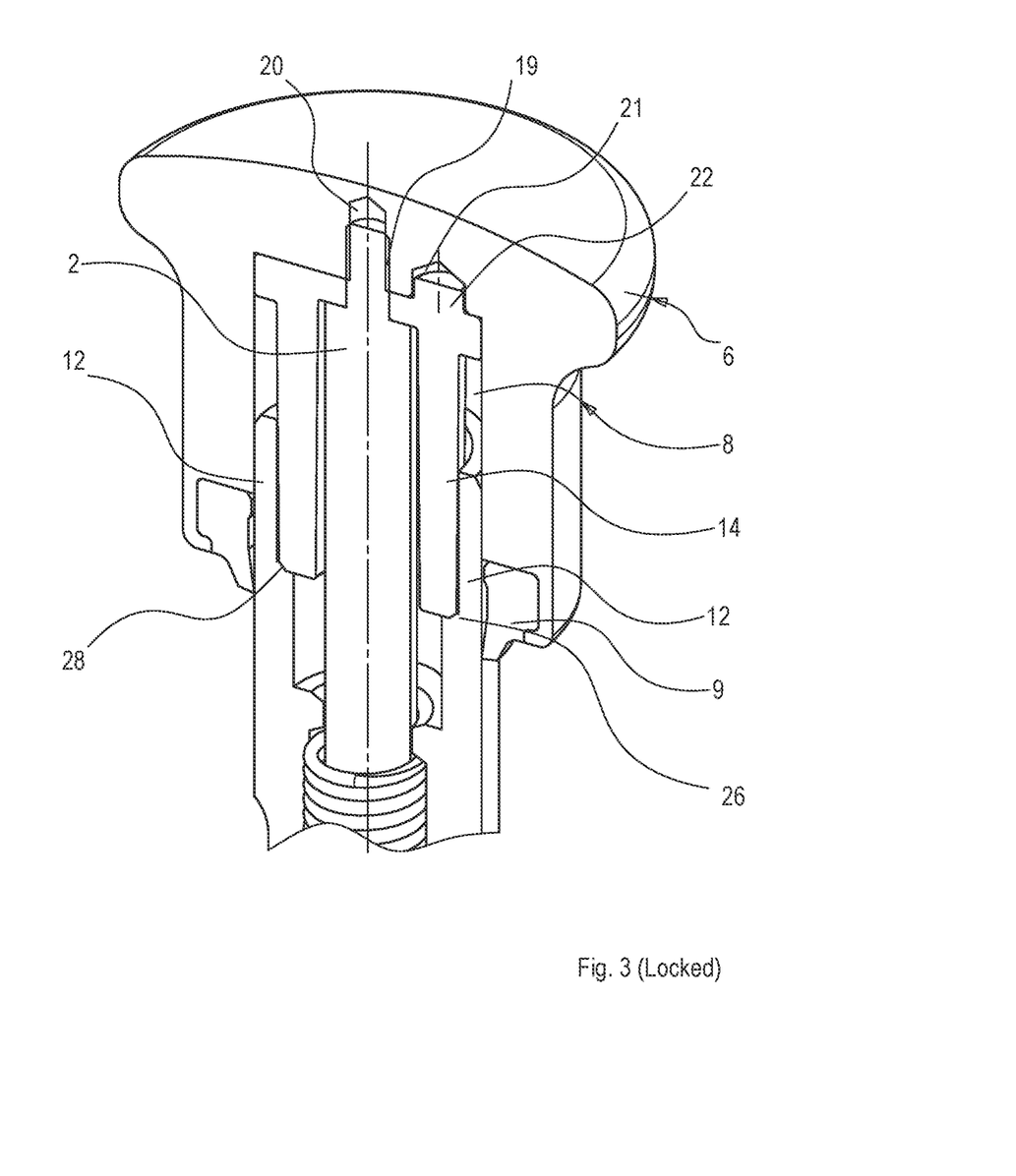
FIG. 3: shows a perspective view of the actuator button with the illustration of the locking mechanism in the locked state.
Figure 4:
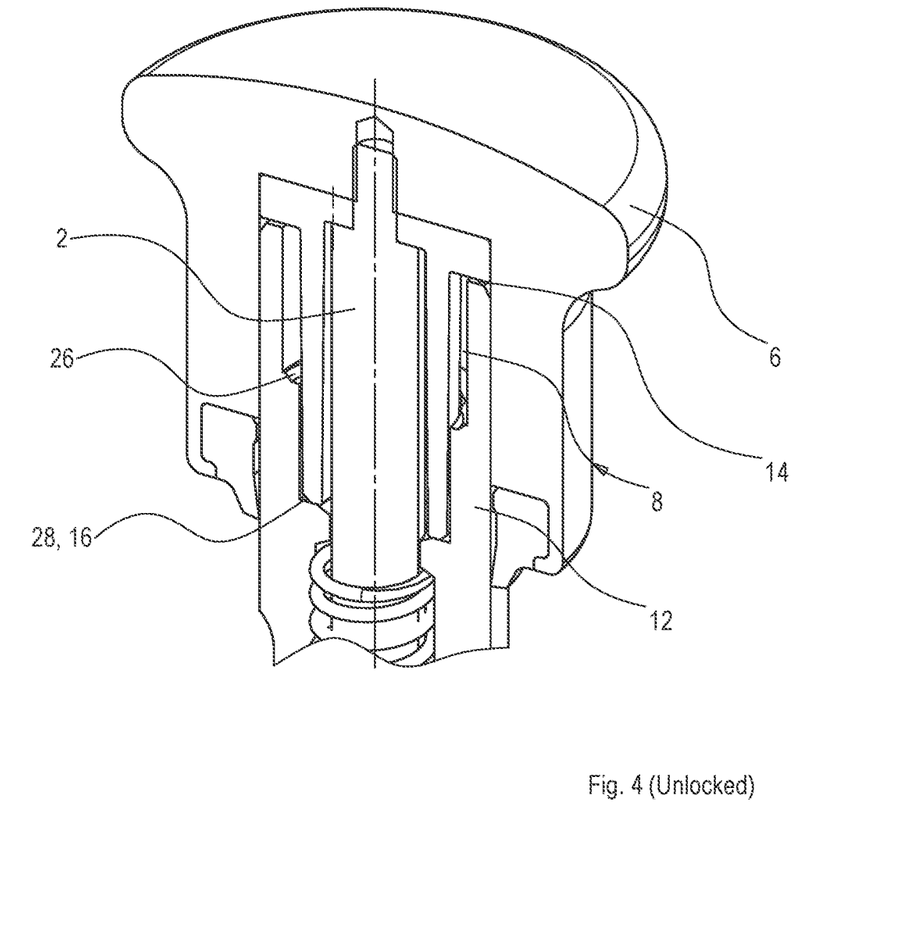
FIG. 4: shows the same illustration in FIG. 3, in the unlocked state.
Figure 5:
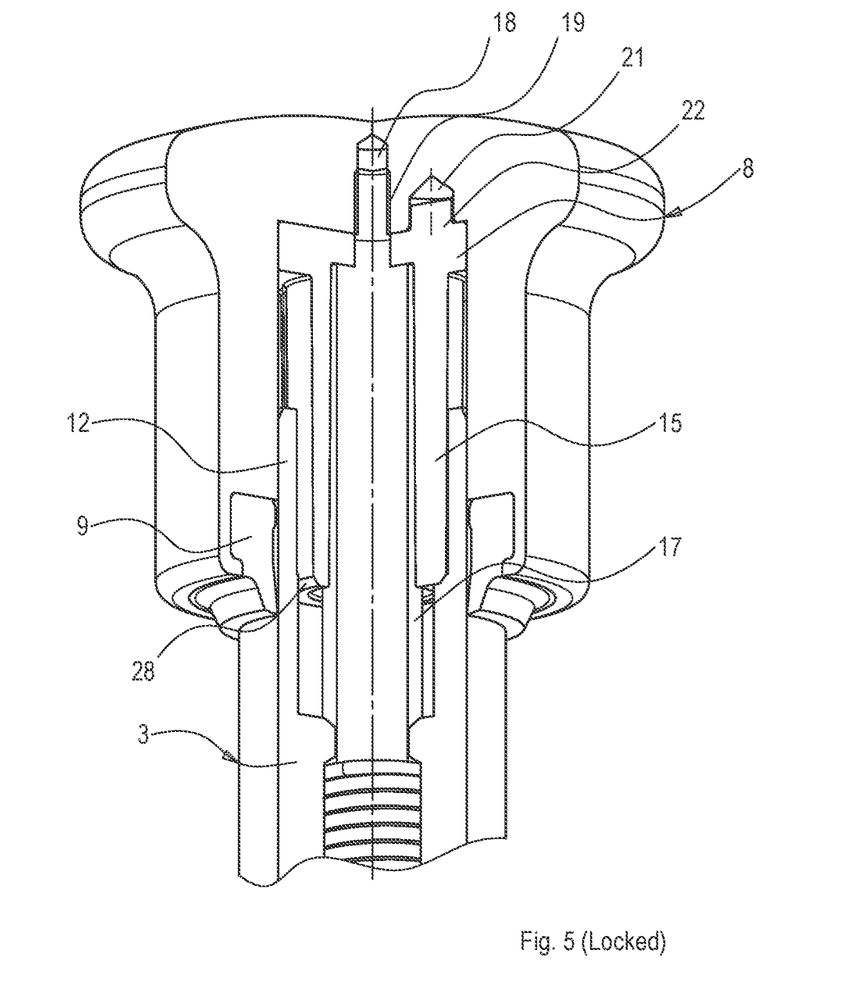
FIG. 5: shows the same illustration of the actuator button in FIG. 4, in the locked state.

FIGS. 3, 4 and 5 show the same components with the same reference symbols, wherein FIG. 3 shows the locked state shown in FIG. 2, and FIG. 4 shows the unlocked state shown in FIG. 1, and FIG. 5, in turn, shows the locked state shown in FIG. 2.

Identical components are given the same reference symbols, such that the explanations for FIGS. 1 and 2 also apply to the terminology and components in FIGS. 3 to 5.

Figure 6:
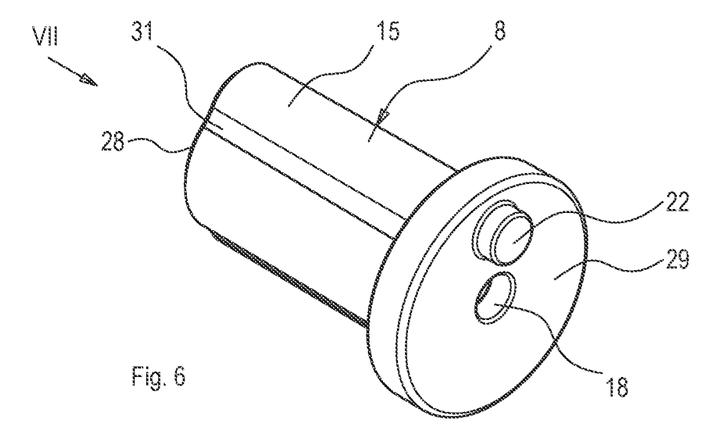
FIG. 6: shows a perspective view of the locking sleeve.

FIG. 6 shows the perspective view of a locking sleeve 8, substantially composed of a cylindrical annular lip, which has a central bore, through which the pin 2 passes.

A detent pin 22 is formed acentric to the central bore 18, which engages in a dedicated blind hole 21 in the interior of the actuator button 6 and is anchored there in the accordance with the exemplary embodiments described above.

Such an attachment has the advantage that a particularly operationally secure and simple securing of the locking sleeve 8 in the interior of the actuator button 6 is ensured.

A locking contour 28 on the locking sleeve is formed on the lower end surface of the sleeve extension 15, wherein the locking lug 31 of the locking contour 28 extends into the sleeve extension 15.

In another design, the sleeve extension 15 can also be cylindrical, such that the opposing locking lugs 31 projecting radially therefrom are only formed at the bottom in the region of the locking contour 28.

Figure 7:
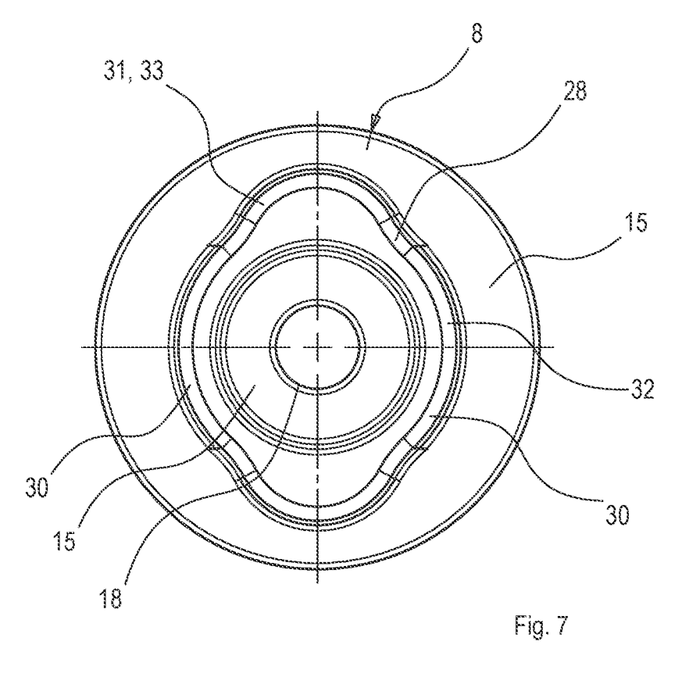
FIG. 7: shows an end view of the locking sleeve along arrow VII in FIG. 6.

FIG. 7 shows the special design of the locking contour 28 of the locking sleeve 8 at the lower end surface, where it can be seen that the two diametrically opposed locking lugs 31 form a locking region, and that there are curved segments therebetween that do not form locking sections.

It is preferred thereby that the locking lugs 31 are formed in the region of an angled bevel 32, as can be seen in FIG. 8.

FIG. 8 shows that the locking contour is formed in the region of the bevel 32 running at an angle to the longitudinal axis.

The formation of the locking contour 28 as a diagonal bevel 32 in accordance with FIG. 8 has the advantage that it is not necessary to first raise the actuator button 6 counter to the force of the compression spring 7, and instead, it can be rotated directly from one locking position to the other, without having to raise it.

The bevel 32 thus forms an approach incline to the housing-side locking contour 34, such that it is not necessary to raise the actuator button.

Instead of a diagonal bevel 32, as is shown in FIG. 8, the preferred, simple rotational movement, which requires no lifting movement, is replaced in another embodiment by a combined pulling and rotating movement. In the latter case, the bevel 32 is omitted, leaving a smooth end surface, that is not diagonal to the vertical plane.

In this case, the actuator button 6, with the bolt 2 secured thereto, must be raised, counter to the force of the compression spring 7.

Instead of the straight, diagonal bevels 32, rounded bevels can also be used, i.e. the diagonal line in FIG. 8 forming the bevel 32 can also be curved.

Figure 9:
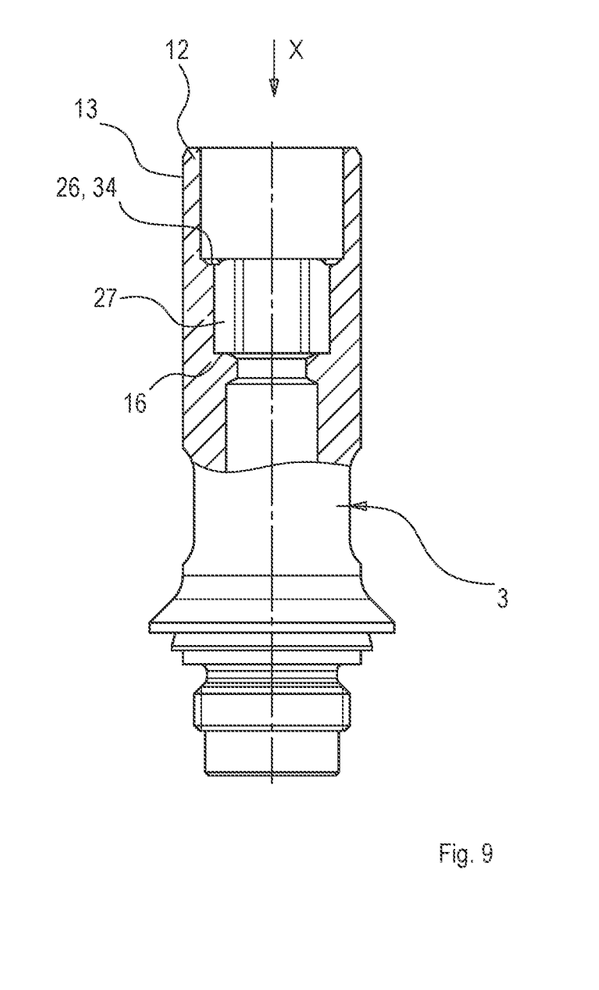
FIG. 9: shows a longitudinal section through the guide sleeve.
Figure 10:
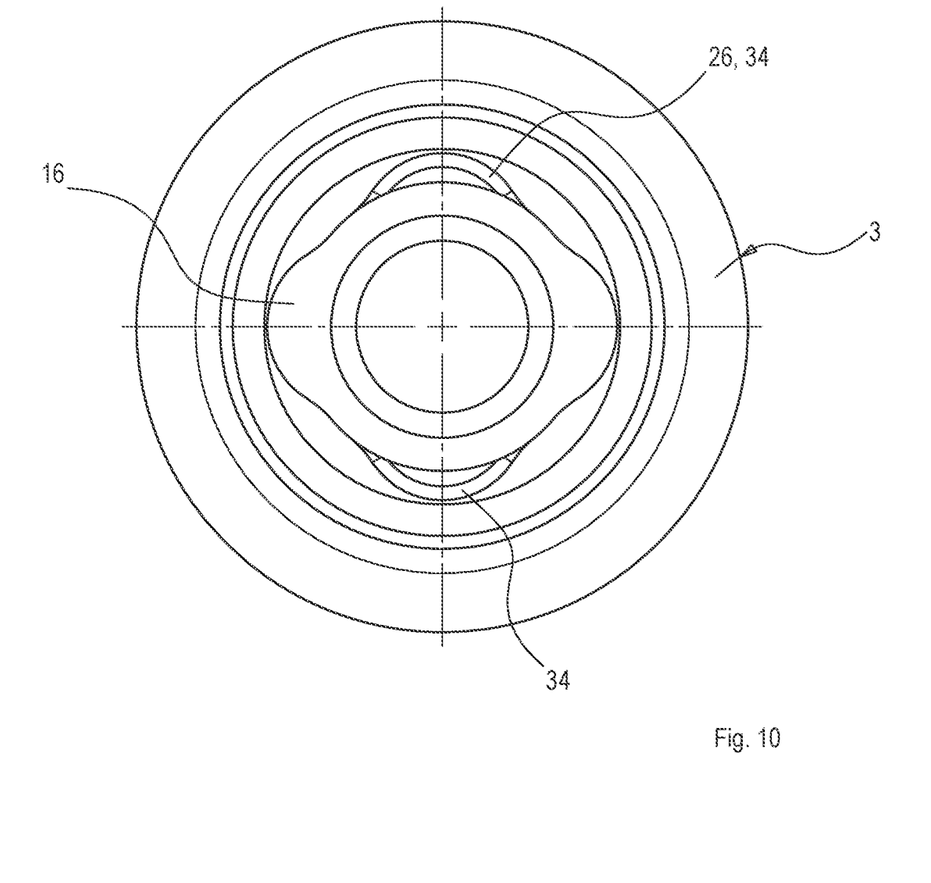
FIG. 10: shows an end view of the guide sleeve along arrow X in FIG. 9.

FIGS. 9 and 10 show the opposing locking contours 34 of the guide sleeve 3, wherein the same reference symbols have been used for identical components.

FIG. 10 shows the end view of the guide sleeve 3 viewed along the direction of the arrow X in FIG. 9.

It can be seen that there are two guide contours that are spaced apart axially, i.e. these two axially spaced apart surfaces 26 and 16 define the locked and unlocked states of the actuator button 6.

The detent element 26 forms the locking contour 34 shown in FIG. 10. The locking contour is substantially composed of two diametrically opposed locking lugs, also referred to as detent elements 26, and there are two opposing stop surfaces 26 in the intermediate space, which are curved, and are not part of the locking assembly.

The two spaced apart guide surfaces of the locking assembly are located in the region of the locking recess 27 accordingly.

In the locked state, the locking lugs 31 of the locking sleeve 8 bear on the detent element 26 with the locking contour 34 of the guide sleeve 3 according to FIG. 10.

When the locking lugs 31 are rotated, e.g. 90°, by rotating the locking sleeve 8, these locking lugs 31 pass downward through the locking hole 27 in the axial direction, and strike the lower, base-end stop surfaces of the guide sleeve 3. At this point, the unlocked state shown in FIG. 1 has been reached.

It is thus clear that the locking mechanism with the spaced apart guide surfaces 16, 26, 34, which are formed in the region of a central bore 27 in the interior of the guide sleeve 3, is entirely integrated in the interior of the actuator button 6 in a sealed manner, such that there are no longer any components that project radially from the guide sleeve 3.

REFERENCE SYMBOLS 1 sealing nut
2 pin
3 guide sleeve (first)
4 sealing ring
5 sealing ring
6 actuator button
7 compression spring
8 locking sleeve
9 rod seal
10 clamp
11 mounting plate
12 guide sleeve (second of 3)
13 sliding surface
14 central bore (of 6)
15 sleeve extension (of 8)
16 stop surface (of 3)
17 central bore (of 8)
18 hole (of 8)
19 threaded bolt (of 2)
20 threaded hole (of 6)
21 blind hole
22 detent pin
23 direction of arrow
24 direction of arrow
25 longitudinal axis 26 detent element (of 3)
27 locking recess (of 3)
28 locking contour (of 8)
29 annular lip
30 curve segment
31 locking lug
32 bevel
33 locking region
34 locking contour (of 3)
35 end surface region

The invention claimed is:

1. A locking pin assembly with a protected locking mechanism, comprising:
an actuator button including a central bore;
a first guide sleeve attachable to a machine part, the guide sleeve including a central bore and a locking recess;
a pin connected to the actuator button, the pin axially displaceable and selectively secureable between a locked position and an unlocked position within the central bore of the guide sleeve by actuation of the actuator button, the pin biased by a spring force of a compression spring;
a locking mechanism disposed within the central bore of the actuator button, comprising:
a second guide sleeve connected to the first guide sleeve and extending coaxially therefrom, the second guide sleeve disposed in the central bore of the actuator button;
a locking sleeve secured to the actuator button, the locking sleeve including a sleeve extension having a locking contour with at least one locking lug, the at least one locking lug receivable within the locking recess of the first guide sleeve; and
a detent element located inside the first guide sleeve which interacts with the locking contour of the locking sleeve; wherein
in the locked position of the pin, the locking lugs of the locking sleeve bear on the detent element of the first guide sleeve, and wherein when the locking lugs are rotated by rotating the locking sleeve, the locking lugs pass through the locking recess of the first guide sleeve in an axial direction until the unlocked position of the pin is reached; and wherein
the second guide sleeve extends into the central bore of the actuator button, with an outer circumference of the second guide sleeve slidingly interfacing with an inner circumference of the central bore of the actuator button in both the unlocked state and the locked state of the locking pin such that the locking mechanism is sealed in the central bore of the actuator button in the region of the second guide sleeve.

2. The locking pin assembly of claim 1, further comprising a rod seal is disposed at a base end of the actuator button, the rod seal displaceable axially with the actuator button and sealed to an outer circumference of the first guide sleeve.

3. The locking pin assembly of claim 2, wherein the locking sleeve is attached to an inner end surface region of the actuator button, and a sleeve extension of the locking sleeve is coaxially positioned within the second guide sleeve.

4. The locking pin assembly of claim 2, wherein the actuator button is rotatable 90° from the locked position toward the unlocked position until the locking contour of the locking sleeve is disengaged from the detent element in the unlocked position, wherein the actuator button and the pin are moved into a biased position by the spring force of the compression spring.

5. The locking pin assembly of claim 1, wherein the locking sleeve is attached to an inner end surface region of the actuator button, and a sleeve extension of the locking sleeve is coaxially positioned within the second guide sleeve.

6. The locking pin assembly of claim 5, wherein the actuator button is rotatable 90° from the locked position toward the unlocked position until the locking contour of the locking sleeve is disengaged from the detent element in the unlocked position, wherein the actuator button and the pin are moved into a biased position by the spring force of the compression spring.

7. The locking pin assembly claim 5, wherein the locking contour comprises a plurality of locking lugs formed on a lower end surface of the sleeve extension of the locking sleeve.

8. The locking pin assembly of claim 5, wherein the locking sleeve includes a lower axial end surface forming the locking contour which interacts with the locking recess in the guide sleeve.

9. The locking pin assembly of claim 8, further comprising a bevel disposed at a diagonal to a longitudinal axis of the locking pin, the bevel forms an approach incline to a locking contour on the guide sleeve such that is it not necessary to linearly actuate the actuator button or actuation between the locked and unlocked positions.

10. The locking pin assembly claim 8, wherein the locking contour comprises a plurality of locking lugs formed on a lower end surface of the sleeve extension of the locking sleeve.

11. The locking pin assembly of claim 8, wherein the actuator button is rotatable 90° from the locked position toward the unlocked position until the locking contour of the locking sleeve is disengaged from the detent element in the unlocked position, wherein the actuator button and the pin are moved into a biased position by the spring force of the compression spring.

12. The locking pin assembly of claim 1, wherein the actuator button is rotatable 90° from the locked position toward the unlocked position until the locking contour of the locking sleeve is disengaged from the detent element in the unlocked position, wherein the actuator button and the pin are moved into a biased position by the spring force of the compression spring.

13. The locking pin assembly claim 12, wherein the locking contour comprises a plurality of locking lugs formed on a lower end surface of the sleeve extension of the locking sleeve.

14. The locking pin assembly of claim 12, further comprising a bevel disposed at a diagonal to a longitudinal axis of the locking pin, the bevel forms an approach incline to a locking contour on the guide sleeve such that is it not necessary to linearly actuate the actuator button or actuation between the locked and unlocked positions.

15. The locking pin assembly of claim 12, wherein there are a total of two locking positions between the locking sleeve and the guide sleeve.

16. The locking pin assembly claim 15, wherein the locking contour comprises a plurality of locking lugs formed on a lower end surface of the sleeve extension of the locking sleeve.

17. The locking pin assembly of claim 15, further comprising a bevel disposed at a diagonal to a longitudinal axis of the locking pin, the bevel forms an approach incline to a locking contour on the guide sleeve such that is it not necessary to linearly actuate the actuator button or actuation between the locked and unlocked positions.

18. The locking pin assembly claim 1, wherein the locking contour comprises a plurality of locking lugs formed on a lower end surface of the sleeve extension of the locking sleeve.

19. The locking pin assembly claim 18, wherein the locking contour of the locking sleeve comprises a pair of diametrically opposing locking lugs, which each form locking regions, the locking sleeve further comprising a plurality of curved segments between the locking lugs that do not form locking regions.

20. The locking pin assembly of claim 18, further comprising a bevel disposed at a diagonal to a longitudinal axis of the locking pin, the bevel forms an approach incline to a locking contour on the guide sleeve such that is it not necessary to linearly actuate the actuator button or actuation between the locked and unlocked positions.

* * * * *